(12) United States Patent
Corsmeier et al.

(10) Patent No.: US 11,905,843 B2
(45) Date of Patent: Feb. 20, 2024

(54) LINER SUPPORT SYSTEM

(71) Applicant: General Electric Company, Schenectady, NY (US)

(72) Inventors: Donald Michael Corsmeier, West Chester, OH (US); Bernard James Renggli, Cincinnati, OH (US); Kurt J. Bonner, Maineville, OH (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 16/837,553

(22) Filed: Apr. 1, 2020

(65) Prior Publication Data
US 2021/0310377 A1 Oct. 7, 2021

(51) Int. Cl.
*F01D 25/30* (2006.01)
*F01D 25/00* (2006.01)
*F01D 25/14* (2006.01)

(52) U.S. Cl.
CPC .......... *F01D 25/30* (2013.01); *F01D 25/005* (2013.01); *F01D 25/14* (2013.01); *F05D 2220/323* (2013.01); *F05D 2240/14* (2013.01); *F05D 2260/20* (2013.01); *F05D 2260/31* (2013.01); *F05D 2300/6033* (2013.01)

(58) Field of Classification Search
None
See application file for complete search history.

(56) References Cited

U.S. PATENT DOCUMENTS

| | | | | |
|---|---|---|---|---|
| 3,866,417 A | * | 2/1975 | Velegol | F02K 1/82 60/766 |
| 4,749,298 A | * | 6/1988 | Bundt | F23R 3/60 165/169 |
| 4,820,097 A | * | 4/1989 | Maeda | F23R 3/002 411/DIG. 2 |
| 5,072,785 A | * | 12/1991 | Dressler | F01D 25/243 165/47 |
| 2005/0150632 A1 | * | 7/2005 | Mayer | F02K 1/822 165/47 |

(Continued)

FOREIGN PATENT DOCUMENTS

| | | |
|---|---|---|
| CN | 102808689 | 12/2012 |
| CN | 106062443 | 10/2016 |
| WO | 2014116616 | 7/2014 |

*Primary Examiner* — Jason H Duger
(74) *Attorney, Agent, or Firm* — Fitch, Even, Tabin & Flannery LLP (57) ABSTRACT

A liner support system for an exhaust liner in an aircraft engine. The liner support system includes a plurality of posts that space the exhaust liner from the exhaust duct, the plurality of posts spacing the exhaust liner from the exhaust duct further supporting the exhaust liner. Each post includes an interface region adjacent to the back side of the exhaust liner sealed to the back side of the exhaust liner, a shank extending to a low pressure region, and a hollow passageway internal to the shank, providing fluid communication between the interface region and the low pressure region. The low pressure region results in pressure against the liner, pulling the liner adjacent the post interface region against the post while preventing fluid leakage between the exhaust liner and the interface region. The posts create a pattern of alternating pressures in the liner allowing for elimination of hangers.

20 Claims, 8 Drawing Sheets

(56) References Cited

U.S. PATENT DOCUMENTS

2006/0242965 A1    11/2006   Shi  
2008/0022689 A1     1/2008   Farah  
2014/0286763 A1     9/2014   Munshi  
2017/0089300 A1     3/2017   Tanaka  
2018/0283691 A1*   10/2018   Corsmeier ............. F16B 39/06

* cited by examiner

LINER SUPPORT SYSTEM

FIELD OF THE INVENTION

The present invention is generally directed to a liner support system, and specifically to a liner support system for CMC exhaust liners.

BACKGROUND OF THE INVENTION

Exhaust systems in aircraft engines are conduits for gases from combustion passing through the turbine section. These hot gases, after passing through the turbine section and into the exhaust section, are referred to as exhaust gases and are used to provide thrust to propel the aircraft.

Exhaust systems are complex structures and generally comprise an exhaust liner mounted within an exhaust duct. The exhaust duct(s) in modern aircraft is/are housed within the airframe of the aircraft in an engine bay. The exhaust duct is mounted within the engine bay using conventional methods.

The exhaust liner is mounted within the exhaust duct. The exhaust liner is spaced from the exhaust duct and held in place within the exhaust liner by hanger systems. The hanger systems are complex systems and have typically been made of superalloys or other high strength materials. Exhaust liners have been made from high temperature superalloys as the liners form a flow path boundary surface for the hot exhaust gases. When hanger systems are not brazed or bonded to the exhaust liner, the hanger systems may use high strength fasteners such as bolts or rivets to attach the liner to the duct. These hanger systems reside within the annulus between the duct and the liner. However, cooling air drawn from the engine fan, referred to as fan air, also flows within this annulus, maintaining the temperature of the hanger systems relatively low and allowing the use of lower temperature materials. The fasteners that are used to hold the hanger systems in position with respect to the engine liner and the engine duct extend through the liner and form part of the flow path boundary over which hot gas flows. Thus, these fasteners are comprised of high strength superalloys.

Ceramic matrix composite (CMC) materials are lightweight materials that are being substituted for metals in many aircraft applications. A number of CMC materials have high temperature capabilities and find use as a substitute material in high temperature engine applications such as exhaust liners. However, liners comprising these CMC materials still must be mounted to the engine duct.

BRIEF DESCRIPTION OF THE INVENTION

The present invention advantageously utilizes a CMC liner as a substitute for a metallic (superalloy) liner. In the present invention, the net load on the CMC liner is reduced by a system of delta pressure regions alternating the load incrementally along the liner surface. The alternating delta pressure regions reduce the load, allowing a reduction in the number of hangers or supports required to mount the liner to the duct.

The reversed or alternating delta pressure regions result from the use of a plurality of posts in contact with the back side of the liner, the back side of the liner being opposite the hot gas flow path side of the liner, the posts extending across the annulus between the exhaust liner and the exhaust duct, through the exhaust duct into a low pressure region such as the engine bay. Fan cooling air flows through this annulus providing cooling to the back side of the liner. Each post includes an interface region of preselected area that is adjacent to a mating surface, such as a preselected interface area of the liner on the backside of the liner. A perimeter or periphery of the post defines the interface region or interface area of the post. The interface region of the post is adjacent to the mating surface of the liner and is in contact with the liner surface, the post perimeter seated and sealed against the backside of the liner surface. The post includes a shank that is integral with and extends away from the interface with the liner to a low pressure region. The shank includes an internal hollow passageway providing fluid communication between the interface with the liner and the low pressure region.

In an exhaust system, the shank extends across the annulus between the exhaust duct and the exhaust liner, through an aperture in the exhaust duct into the low pressure region. The hollow passageway in the shank provides fluid communication between the interface and the low pressure region. A post face seal positioned adjacent to or within the perimeter seals the post perimeter to the back side of the exhaust liner, preventing fluid leakage across the post perimeter between the back side of the liner and the post interface region. A post exhaust duct seal at the interface of the exhaust duct and the post shank minimizes or completely eliminates leakage of fan air flowing through the annulus around the post shank.

During engine operation, core gas flow produces a pressure against the exhaust liner gas flow path boundary side toward the duct, this outward pressure arbitrarily defined herein as a positive pressure. This outward pressure is countered by the fan air flowing through the annulus between the exhaust liner and the exhaust duct, producing an inward pressure against the back side of the liner, arbitrarily defined herein as a negative pressure countering the core gas pressure. The inward fan air pressure generally is greater than the outward core gas flow pressure, resulting in a net negative inward pressure against the backside of the exhaust liner. Conventionally, hangers are used to maintain the liners in position during engine operation to counteract this pressure.

The hollow shanks of the posts of the present invention extend into the engine bay. During engine operation, the engine bay is at a pressure that is at or close to atmospheric pressure, which is significantly less than the pressures developed by the fan air in the annulus or the core gas flow on the gas flow path boundary side of the exhaust liner. Each post thus develops a sink pressure at its interface region with the back side of the liner. Since this sink pressure is less than the core gas pressure, the resultant pressure at the interface area of the post with the liner is a net positive outward pressure in the localized interface region.

The use of the posts creates an alternating pressure pattern across the liner during engine operation. At the post interface region, a net positive outward pressure exists across the liner. Adjacent to the post interface region, a net negative inward pressure against the backside of the liner exists as previously noted. Thus an alternating pressure pattern is created along the liner during engine operation. The use of the posts creating localized regions of sink pressure reduces the overall resultant pressure against the exhaust liner during engine operation.

The present invention advantageously utilizes a differential pressure system to reduce overall load on the engine liner, so that there is a lower resultant pressure against the exhaust liner. This lower resultant pressure allows for a reduction in the number of hangers required to mount a CMC liner and/or the use of hanger material having less strength, such as a lighter weight CMC material.

The reduction in the number of hangers also simplifies the assembly of liners to ducts and overcomes some of the problems associated with fastening and bonding of liners to ducts, presenting even further improvements to the exhaust system such as reduced maintenance and servicing of liners, hangers, and fasteners.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention provides apparatus for mounting an exhaust duct to an exhaust liner in an aircraft engine. Although the exhaust mounting system may be used in any aircraft, it is particularly useful in high performance aircraft engines used to power military aircraft. This apparatus utilizes a plurality of posts spacing the exhaust liner from the exhaust duct creating reversed or alternating delta pressure regions along the exhaust liner resulting in a pattern that reduces the resultant or net pressure on the exhaust liner during engine operation. The posts do not penetrate the exhaust liner. The design of the posts, particularly when flanged, allows the posts to function as hangers. While the posts do not penetrate the exhaust liner, fasteners, which may be used to secure the posts to the exhaust liner, may penetrate the liner. However, other techniques may be used to secure the posts to the liner without penetrating the liner. Since the overall resultant or net pressure on the liner during engine operation is reduced, the number of hangers used to mount the exhaust liner to the exhaust duct may be reduced, resulting in a weight reduction of the exhaust system. Reducing the number of required hangers also simplifies assembly of the liner into the engine exhaust.

Figure 1:
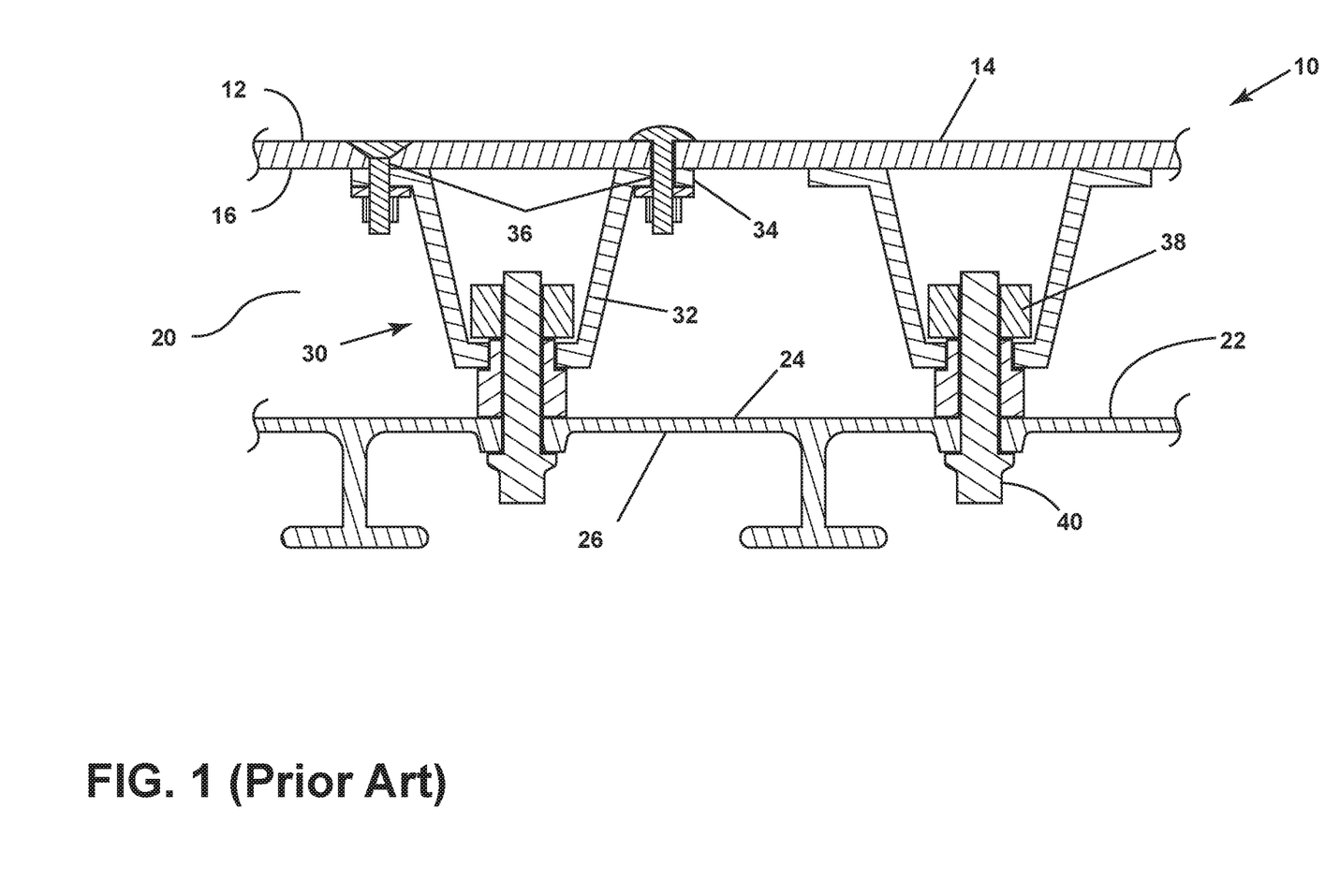
FIG. 1 depicts a prior art exhaust system depicting the exhaust liner mounted to the exhaust duct using a plurality of hanger assemblies.

FIG. 1 depicts a prior art exhaust system 10 in which a plurality of hanger assemblies mounts the exhaust liner 12 to the exhaust duct 22. Exhaust liner 12 has a gas flow path boundary side 14 and a backside 16. Hot exhaust gas, referred to as core gas or core air, flows over gas flow path boundary side 14 during engine operation. Exhaust duct 22 has a first side 24 and a second side 26. When an aircraft engine is mounted in a modern military aircraft, second side 26 of exhaust duct 22 faces the engine bay (not shown). An annulus 20 spaces exhaust duct 22 from exhaust liner 12. Cooling air from the fan, which is pressurized, flows through annulus 20 providing cooling air to the backside 16 of exhaust liner 12 which is heated by hot core exhaust gas. Liner 12 usually includes cooling holes (not shown) extending across the liner from backside 16 to flow path boundary side 14, cooling air flowing from the annulus 20 through the cooling holes to provide additional transpiration or film cooling to the gas flow path boundary side 14 of liner 12.

A hanger system comprising a plurality of hangers 30 mounts exhaust liner 12 to exhaust duct 22. Each hanger 30 includes a hanger body 32 extending across annulus 20, hanger body including a flange 34 in contact with exhaust liner back side 16. A liner bolt 36 extends through flange 34 and liner 12 securing hanger body 32 to liner 12. Liner 12 is typically a high temperature superalloy allowing for alternative embodiments in which a metallic hanger body flange 34 is secured to exhaust liner back side 16 by brazing rather than by use of fasteners such as liner bolts 36. Hanger body 32 is secured to exhaust duct 22 by a fastening system. In FIG. 1, this fastening system includes a nut 38 positioned or formed in hanger body 32. A duct bolt 40 extending through exhaust duct 22 engages nut 38 securing hanger 30 to exhaust duct 22. As the exhaust liner 12, operating at a higher temperature than the exhaust duct 22, may expand or grow thermally with respect to the exhaust duct, the hanger body 32 is designed to slide relative to exhaust duct 22 generally parallel to the contour of the liner at its interface with the duct. In an alternative embodiment, hanger body 32 may be brazed to exhaust duct 22 and sliding can be accommodated at the interface of liner 12 with hanger body flange 34.

Hanger system typically comprises metals such as iron or nickel based alloys which may or may not be high temperature alloys since hanger system is primarily positioned within annulus 20 and is cooled by the fan air flowing through annulus 20. Only liner bolts 36, which extend through liner 12 and are exposed to hot exhaust gas, comprise high temperature superalloy material.

Figure 2:
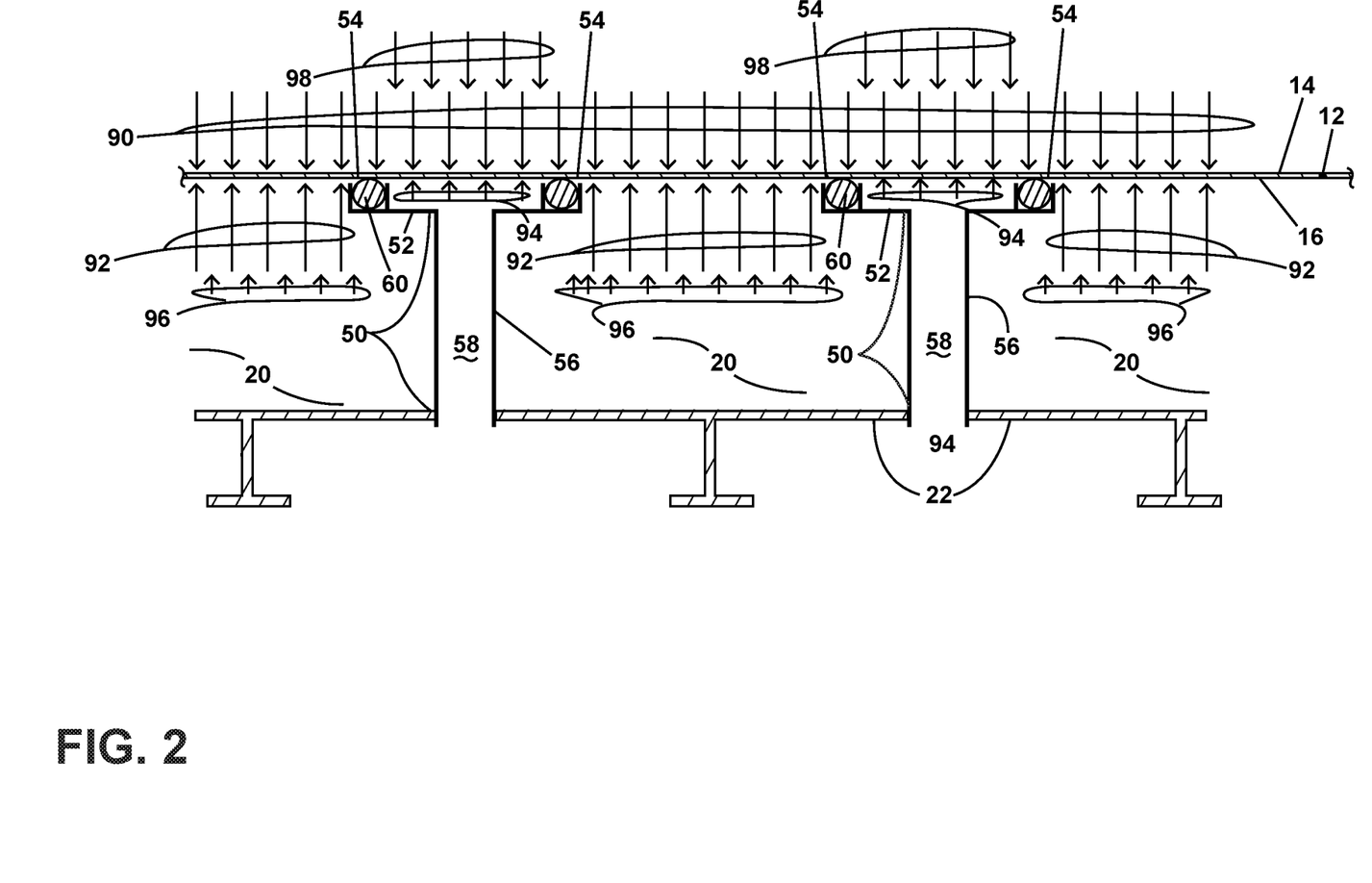
FIG. 2 is an embodiment of the present invention depicting posts spacing the exhaust liner from the exhaust duct while creating alternating pressure zones.

Referring now to FIG. 2, which is an embodiment of the present invention that allows for the elimination of some of the hangers in the hanger system. While the present invention may be used with metallic liners to reduce the weight of the exhaust system by reducing the number of hangers in the exhaust system required to support the metallic liners, the present invention finds particular use in allowing the replacement of metallic liners. The replacement of the metallic liner with a CMC liner provides additional weight savings to the exhaust system. Additional weight savings may be attainable by replacing metal hangers with CMC hangers.

As shown in FIG. 2, a plurality of posts 50 space exhaust liner 12 from exhaust duct 22 while creating alternating pressure zones. When the engine is operating, hot exhaust gas imparts an outward pressure along the gas flow path boundary side 14 of exhaust liner 12 depicted by arrows 90 arbitrarily designated as a positive pressure. Higher pressure fan air flowing in annulus 20 imparts a pressure along the back side 16 of the exhaust liner, arbitrarily designated as a negative pressure and depicted by arrows 92, resulting in a net inward pressure load on exhaust liner 12. The outward pressure 90 imparted by the hot core exhaust gas is countered by fan air pressure 92 flowing in annulus 20. The resultant pressure, depicted by arrows 96, is a net inward or negative pressure in regions in which hot exhaust gas pressure 90 is countered by fan air pressure 92.

Each post 50 includes an interface region 52 with a periphery 54 which interfaces with the back side 16 of exhaust liner 12. The interface region 52 acts as a flange against exhaust liner 12, providing support. Each post 50 has a hollow shank portion 56 having a passageway 58, shank portion 56 extending from interface region 52 across annulus 20 and through exhaust duct 22, passageway 58 opening into the engine bay region of the aircraft, which usually is at or near atmospheric pressure. This creates a sink pressure within the post interface region which is at or near atmospheric pressure, depicted by arrows 94, also arbitrarily designated as a negative pressure. The sink pressure 94 is less than either hot exhaust gas pressure 90 or fan air pressure 92, so that the resultant pressure across the liner at the post interface regions, designated by arrows 98, is greater than the pressure across the liner in regions adjacent the post interface region. In FIG. 2, the net pressure designated by arrows 98 is a positive outward pressure across the liner at the post interface regions. Immediately adjacent the post interface region, the net pressure is a negative inward pressure designated by arrows 96. as the fan air pressure designated by arrows 92 is a negative inward pressure which is greater than hot exhaust gas pressure, a positive outward pressure, designated by arrows 90. As can be seen in FIG. 2, an alternating pressure pattern represented by arrows 96, 98 exists when hot gas pressure and fan air pressure are present in the liner when the engine is operating. Of course, as should be obvious to those skilled in the art, all pressures are at ambient or atmospheric pressure when the engine is not operating.

When the engine is operating, sink pressure 94 in post interface region 52 acting on back side 16 of the exhaust liner is much less that the exhaust gas pressure 90 on the exhaust gas flow path boundary side 14 of the exhaust liner, producing a positive outward pressure. In this circumstance, the pressure alternates along the exhaust liner flow path boundary side 14 from a positive net outward pressure opposite post interface regions, to a lower net negative inward pressure adjacent to the portions of the liner exposed to fan air. When the sink pressure, depicted by arrows 94, is sufficiently low, a net positive pressure occurs, resulting in a pressure reversal, from negative to positive, along post interface region 52 of the exhaust liner surface. If a pressure lower than that provided by the engine bay is required in order to achieve a sink pressure sufficiently low to produce alternating pressures along the liner, or pressure reversals from negative to positive as described above, passageway 58 may be placed in fluid communication with a vacuum pump or a low pressure divergent nozzle region, for example. A face seal 60 is positioned along periphery 54 and against back side 16 of exhaust liner 12 to prevent leakage of fan air across periphery 54 to low pressure regions within post interface regions.

Since hot exhaust gas pressure depicted by arrows 90, also referred to herein interchangeably as core pressure, is less than fan pressure, there is a net negative pressure against exhaust liner 12 from fan air pressure depicted by arrows 92 in annulus 20. But sink air pressure, depicted by arrows 94, results in a net positive pressure depicted by arrows 98 across exhaust liner 12 at the post interface region 52 at and within periphery 54. Thus, during engine operation, there are alternating pressure regions across exhaust liner 12 at the positions of each post 50. Although the pressures along the liner are arbitrarily described as alternating positive and negative pressures for the purposes of the above discussion, one skilled in the art will recognize that pressures alternating from high to low along the surface of the exhaust liner are also within the scope of the present invention.

Figure 3:
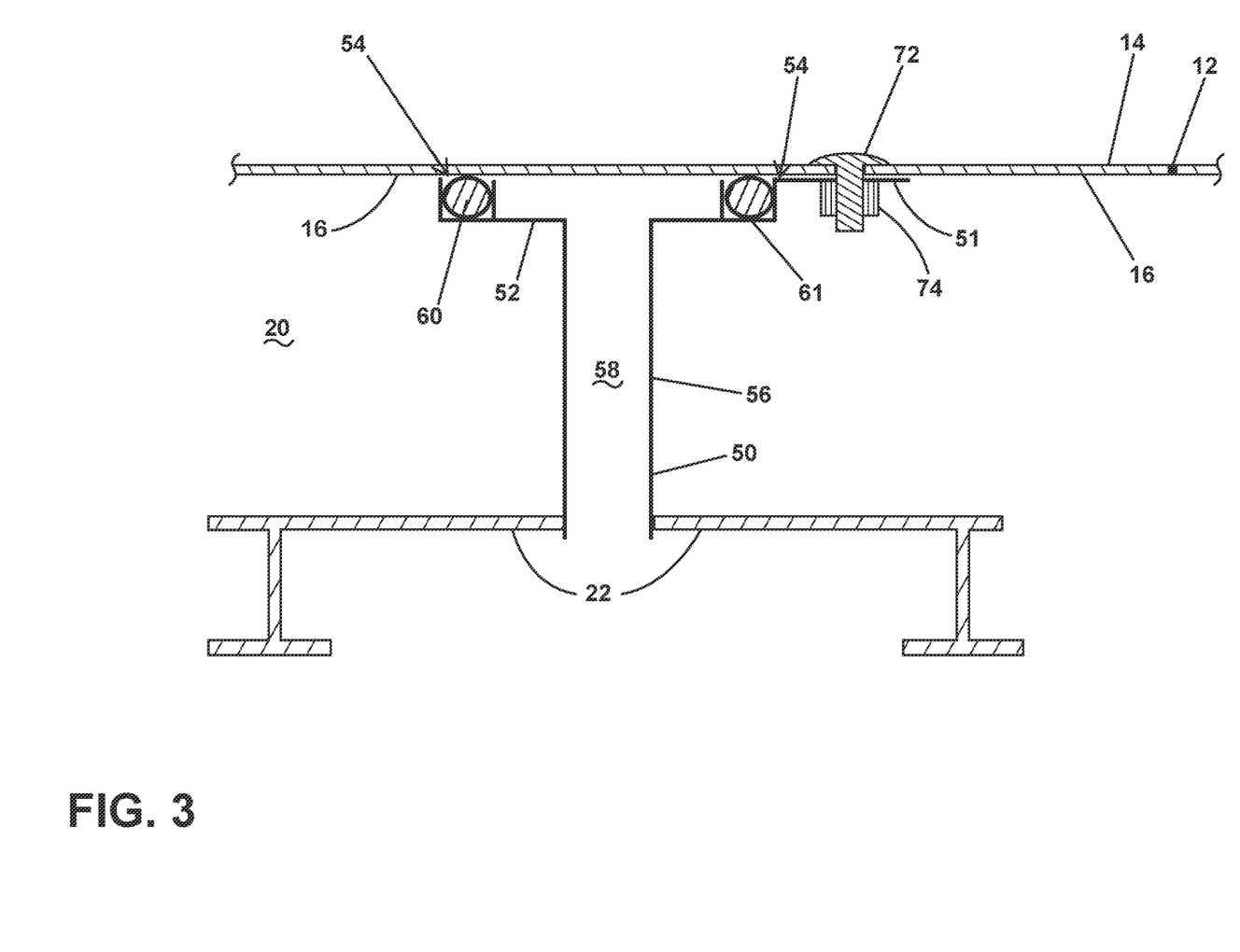
FIG. 3 is a first embodiment of the present invention depicting in cross section a post with a seal bolted to an exhaust liner, the bolts extending through a flange on the post and through the exhaust liner.

FIG. 3 is an embodiment of the invention in which the post is attached to exhaust duct 22 extending across annulus 20 through which fan air flows, post 50 contacting back side 16 of exhaust liner 12. Each post 50 includes a pressurized interface region 52 with a periphery 54 which interfaces with the back side 16 of exhaust liner 12. In this embodiment, periphery also includes a flange 51 extending away from pressurized interface region along the back side 16 of exhaust liner 12. Each post 50 has a hollow shank portion 56 having a passageway 58, shank portion 56 extending from interface region 52 across annulus 20 and through exhaust duct 22, passageway 58 opening into the engine bay region of the aircraft. A post face seal 60 resides in a seal pocket 61 between flange 51 and interface region 52. Post 50 is attached to exhaust liner 12 by a fastener, bolt 72 extending through exhaust liner 12 and secured to the back side 16 of liner 12 by nut 74. Bolt 72 and nut 74 secure post 50 to exhaust liner 12 via flange 51 and also maintain post face seal 60 in contact with back side 16 of exhaust liner 12 under all conditions. Alternating pressure is applied to exhaust liner 12 when the engine is operating as previously set forth and flange relieves some pressure in either direction.

Figure 4:
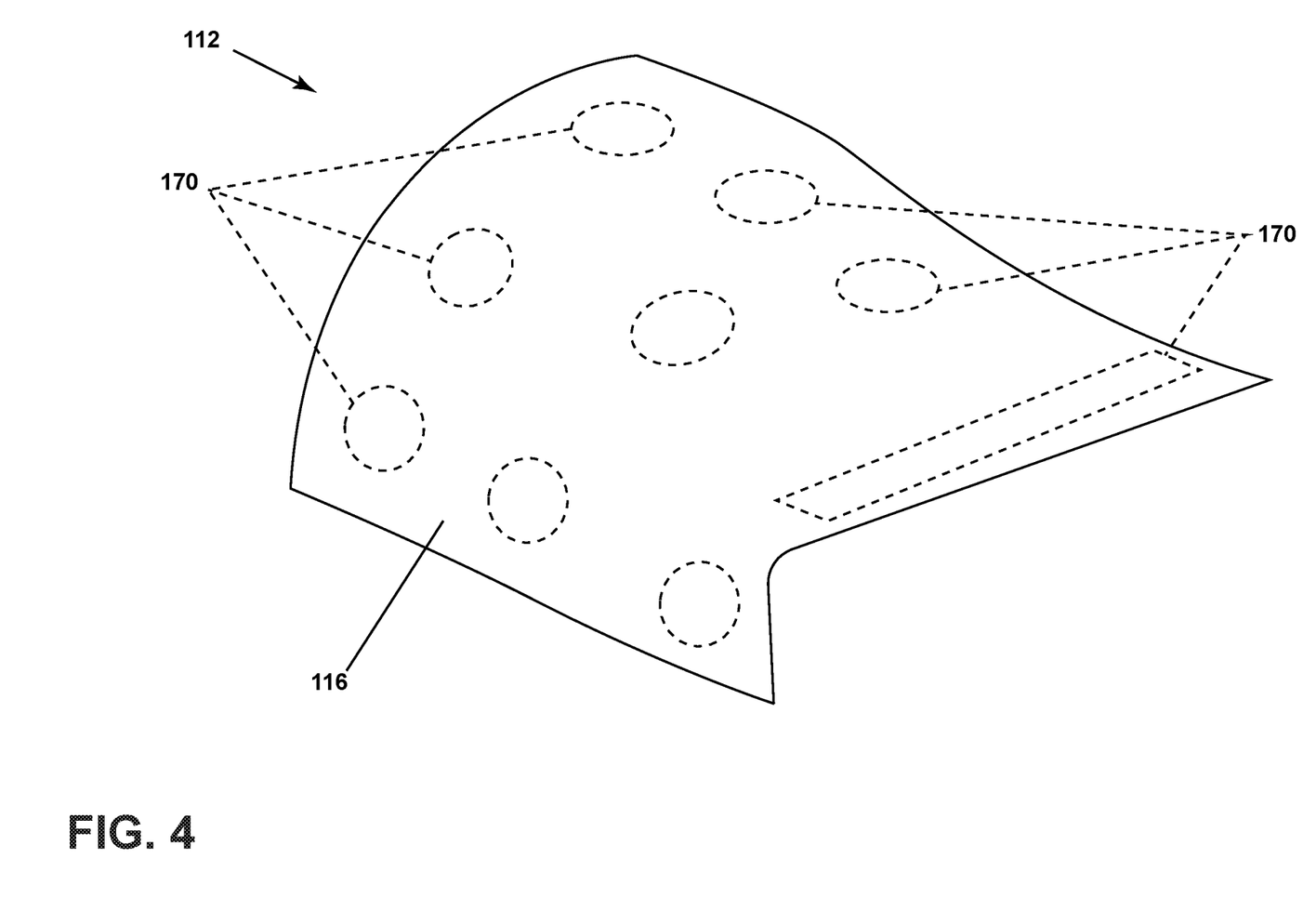
FIG. 4 is a perspective view of a cross section of a contoured exhaust liner having flat areas corresponding to post interface regions.

FIG. 4 shows a section of a contoured exhaust liner showing the regions of positive pressure. FIG. 4 only shows back side 116 of contoured exhaust liner 112. Neither posts 50 nor exhaust duct 22 are shown in FIG. 4. In order to improve sealing with a face seal 60 along a periphery of a post 54, contoured exhaust liner 112 incorporates a plurality of flat areas 170 that may be manufactured or formed in exhaust liner. These flat areas 170 may take any form and are shown both as circular areas and as rectangular areas. Posts 50 will interface with the flat areas 170, the contoured exhaust liner 112 provided with the flat areas to improve sealing between post 50 and contoured exhaust liner 112, which may otherwise become problematic on a contoured surface. When a post 50 interfaces with each of the flat areas 170, then each of the flat areas depicted in FIG. 4 represents a region of positive outward pressure during engine operation while the areas adjacent to the flat areas represent a region of negative inward pressure, that is fan air on back side 116 of exhaust liner 112 from annulus 20 exerts an inward pressure on the back side 116 of exhaust liner 112 toward the centerline of the exhaust nozzle.

Figure 5:
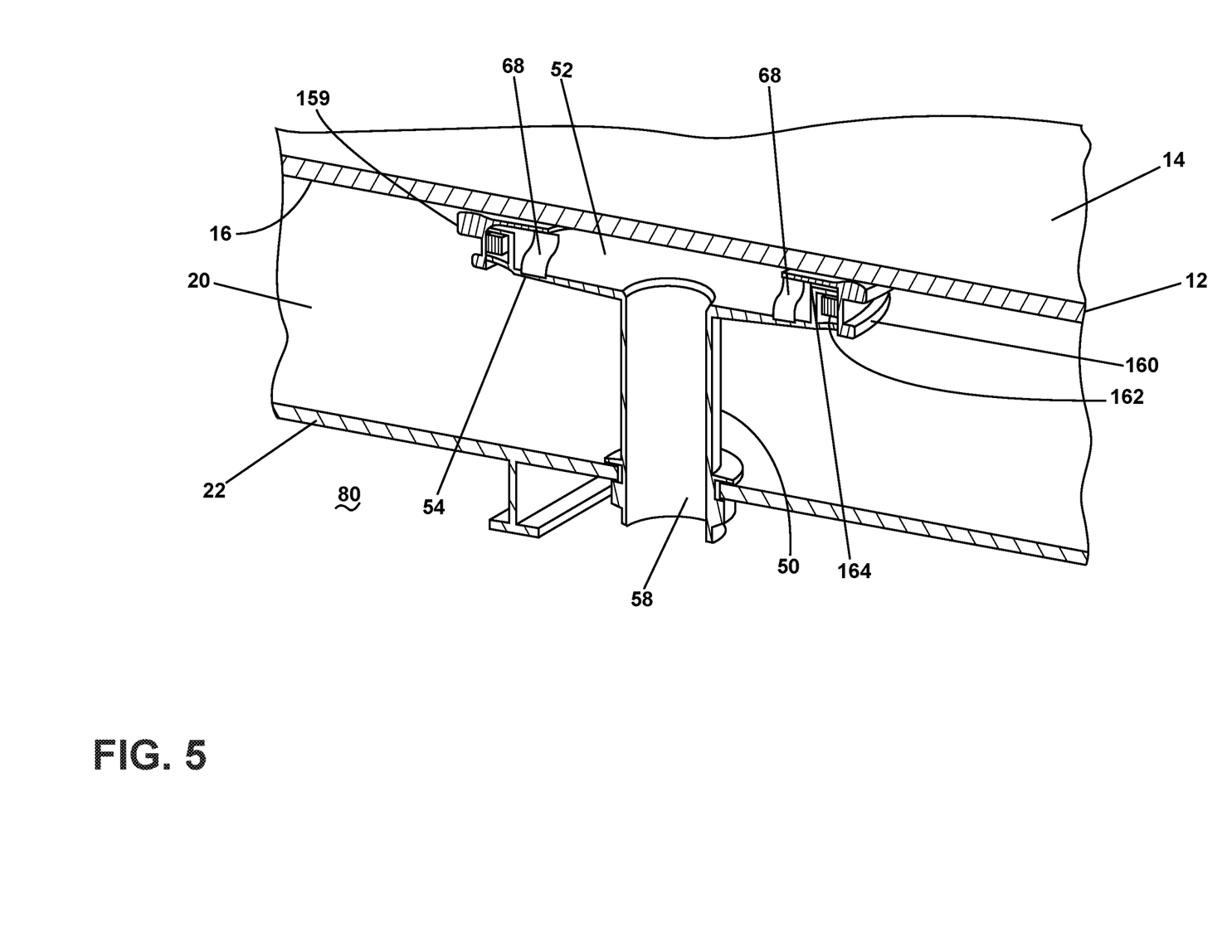
FIG. 5 is a first embodiment of the present invention depicting in cross section a post with a floating seal ring, the post spacing the exhaust liner from the exhaust duct and extending through the duct.

FIG. 5 is a second embodiment of the present invention in which the post provides a pattern of alternating or reversed pressures, but the post does not support the liner. Depicted in cross section is a post 50 with a face seal 159 in a floating seal ring 160, the post spacing exhaust liner 12 from exhaust duct 22 and extending through the duct. When the engine is in operation, a sink pressure in the direction of duct 22 is created in interface region 52. In this embodiment, face seal 159 interfaces with back side 16 of exhaust liner, preventing leakage of fan air from annulus 20 and into post passageway 58. Fan air pressure urges floating seal ring 160 upward which contacts face seal 159 against back side of exhaust liner when the engine is operating. Radial seal 162 exerts a radial force against the floating seal ring 160, the seal being housed in a groove in post 50 and thereby sealing the seal ring to post 50, preventing fan air from entering sink interface region 52.

Also shown in FIG. 5 is a spring 68 which exerts a spring force against an underside 164 of seal ring 160, assuring the seal ring urges seal 159 against back side 16 of liner 12 even when the engine is not operating. During engine operation, spring 68 applies a spring force allowing uniform loading of post face seal 160 against the back side of liner 12. Spring 68 allows the perimeter of the post periphery to move in response to manufacturing tolerances and dynamic conditions such as changes in net pressure, deflection of liner 12 during engine operation, and dimensional changes due to thermal expansion. This floating seal arrangement maintains seal 160 in contact with liner 12 even as the post perimeter moves. Floating seal ring arrangements such as depicted in FIG. 5 are preferably used facing flat regions on exhaust liners. However, the floating seal ring arrangements may also be used with liners having contoured surfaces. In a system using multiple posts, not every post requires a spring. Springs 68 are required to be used with a preselected number of posts at preselected locations sufficient to urge all the seals 159 in the system against the back side 16 of liner 12. The number of springs 68 required and their location will vary based on design. Some designs may require a spring 68 with each post 50, while others may require fewer springs. However, at least one spring 68 is required for the embodiment depicted in FIG. 5. While any spring that exerts a spring force sufficient to urge seals 159 against back side 16 of liner 12, wave springs are preferred, although other springs such as helical coil springs and leaf springs may be used.

Figure 6:
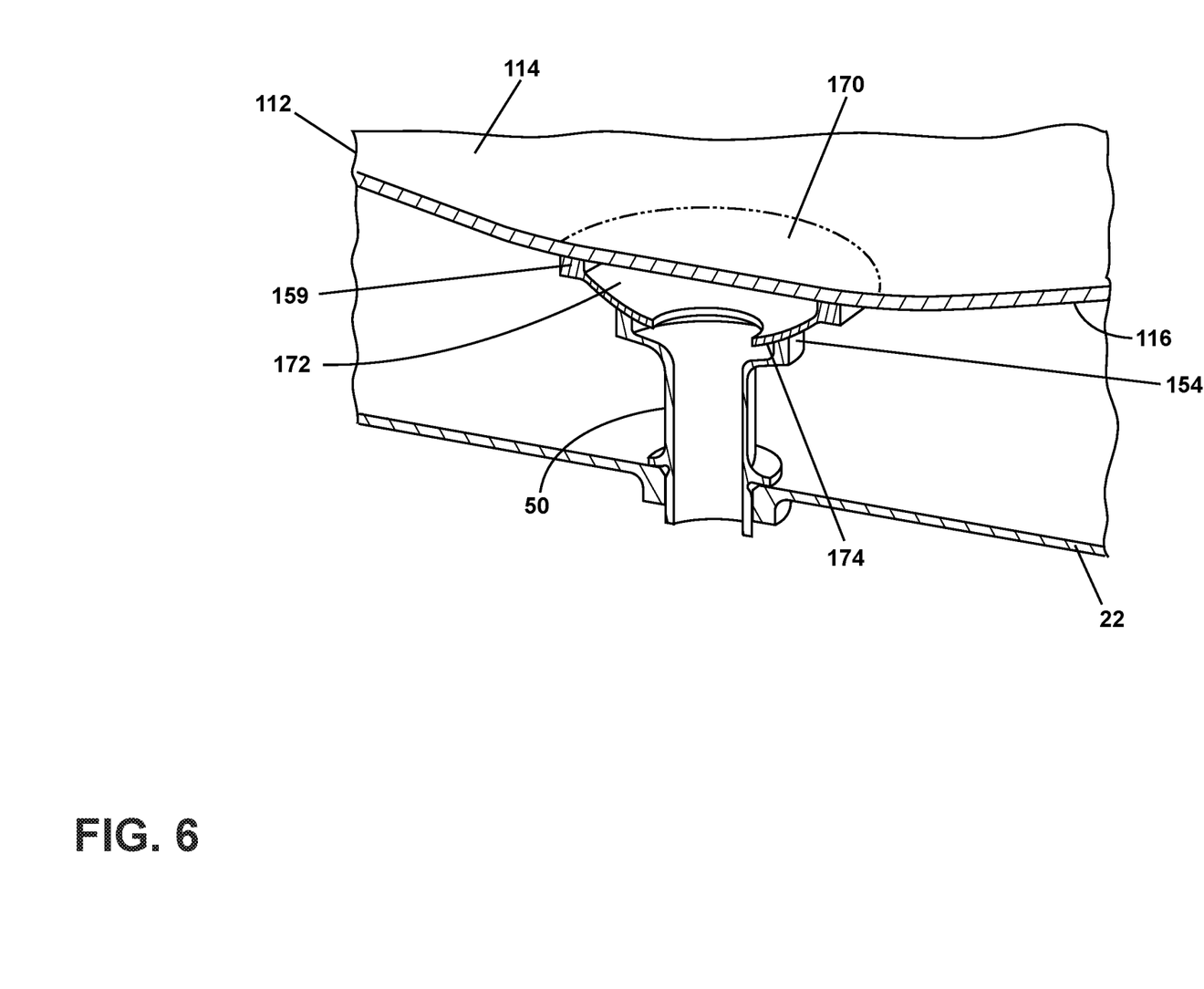
FIG. 6 is a second embodiment of the present invention depicting in cross section a post with a spherical interface for interfacing against a contoured exhaust liner having flat areas.

FIG. 6 is a third embodiment of the present invention, wherein the post provides a region of reverse pressure load. In this arrangement, the post can support the liner and the post can accommodate tilting of the liner during operation. In FIG. 6, there is depicted the angle-conforming load-reacting post 50 for interfacing with a contoured exhaust liner 112 having flat areas 170, such as depicted by the exhaust liner 112 depicted in FIG. 4. Liner 112 also may be contoured without flat areas 170. Post 50 having periphery with a spherical interface 154 having a predetermined geometry is in contact with cup 172. As shown in FIG. 6, the spherical interface has a concave shape facing back side 16 of liner 12, the back side of liner 12 also having a predetermined geometry, shown in FIG. 4 as flat areas 170. The preselected geometries of the periphery, spherical interface forming cup 172, includes both a concave geometry and a convex geometry. The preselected geometries of liner 12 mating with periphery 154 include a flat surface as well as a concave geometry and a convex geometry. Cup 172 retains face seal 159 against back side of liner 12. When the engine is in operation, sink air pressure such as depicted by arrows 94 in FIG. 2 brings the backside 116 of the liner in contact with face seal 159 preventing leakage of fan air flowing in annulus 20 across the interface of face seal 159 against the backside 116 of the liner, thereby sealing post 50 against the liner. Concave face 174 of cup 172 can roll in post spherical interface at periphery 154 to compensate for angular misalignment and operating displacement between post 50 and liner 12. Concave face of cup 172 reacts to rolling misalignment of the liner with respect to the periphery of the post, maintaining the seal in contact at the post perimeter/liner interface in reaction to loads resulting from rolling misalignment. Rolling misalignment results from various liner movements such as thermal expansion of the liner, liner movement due to pressure pulses in the exhaust, duct liner distortion and liner deflection due to operational demands.

Figure 7:
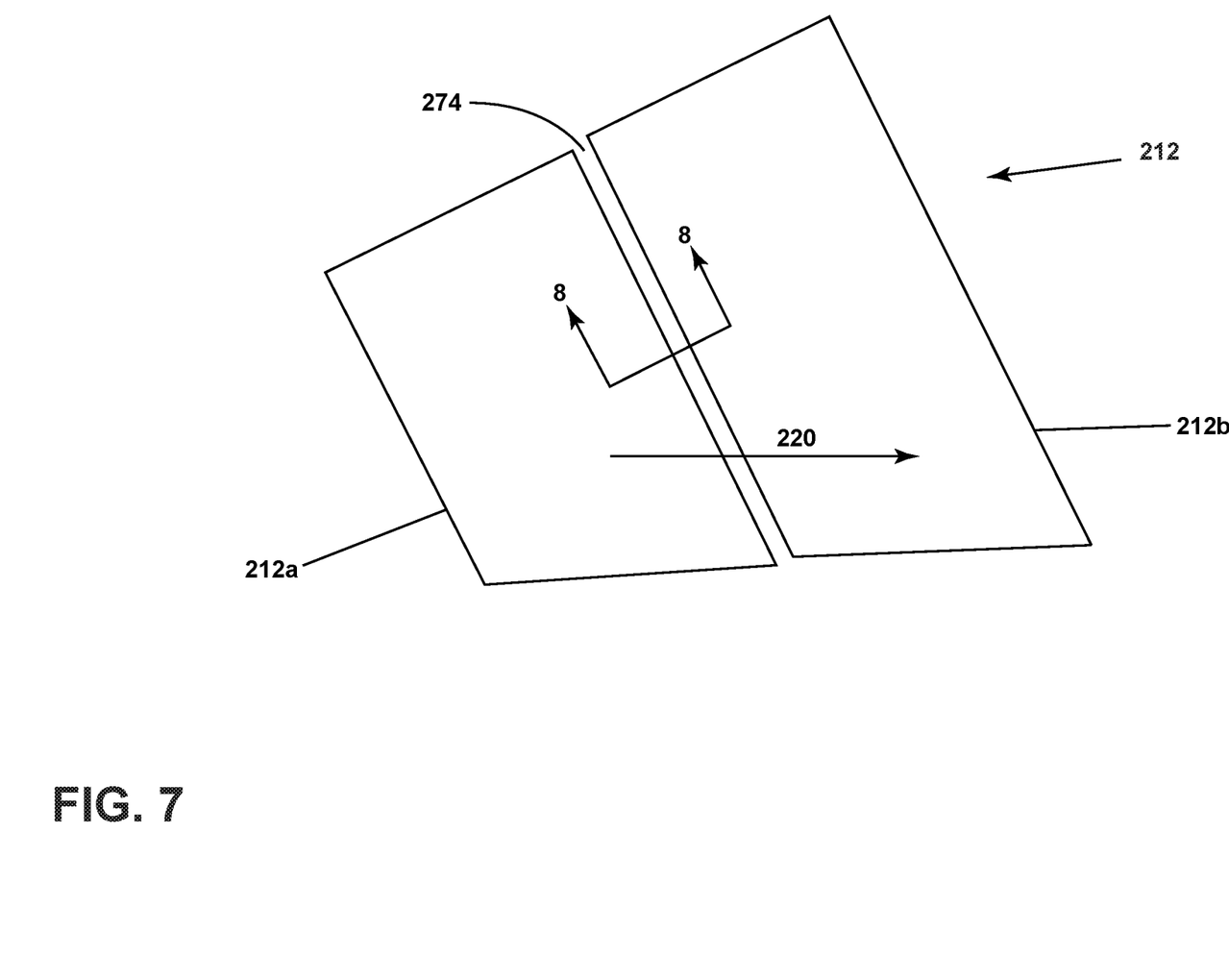
FIG. 7 depicts a portion of an exhaust liner having a center slot for fan cooling air flow.

FIG. 7 depicts a portion of an exhaust liner 212 having a center slot 274 for fan cooling air flow. In this arrangement exhaust liner is segmented into a plurality of liner segments such as segments 212(*a*) and 212(*b*). Center slot 274 separates the two segments and is in fluid communication with fan cooling air flowing in the annulus (not shown) between the exhaust duct and exhaust liner. Center slot extends in a direction non-parallel to the flow of hot exhaust gas depicted by arrows 220 in FIG. 8. Thus, fan cooling air flows through center slot 274 to provide film cooling of liner 212.

Figure 8:
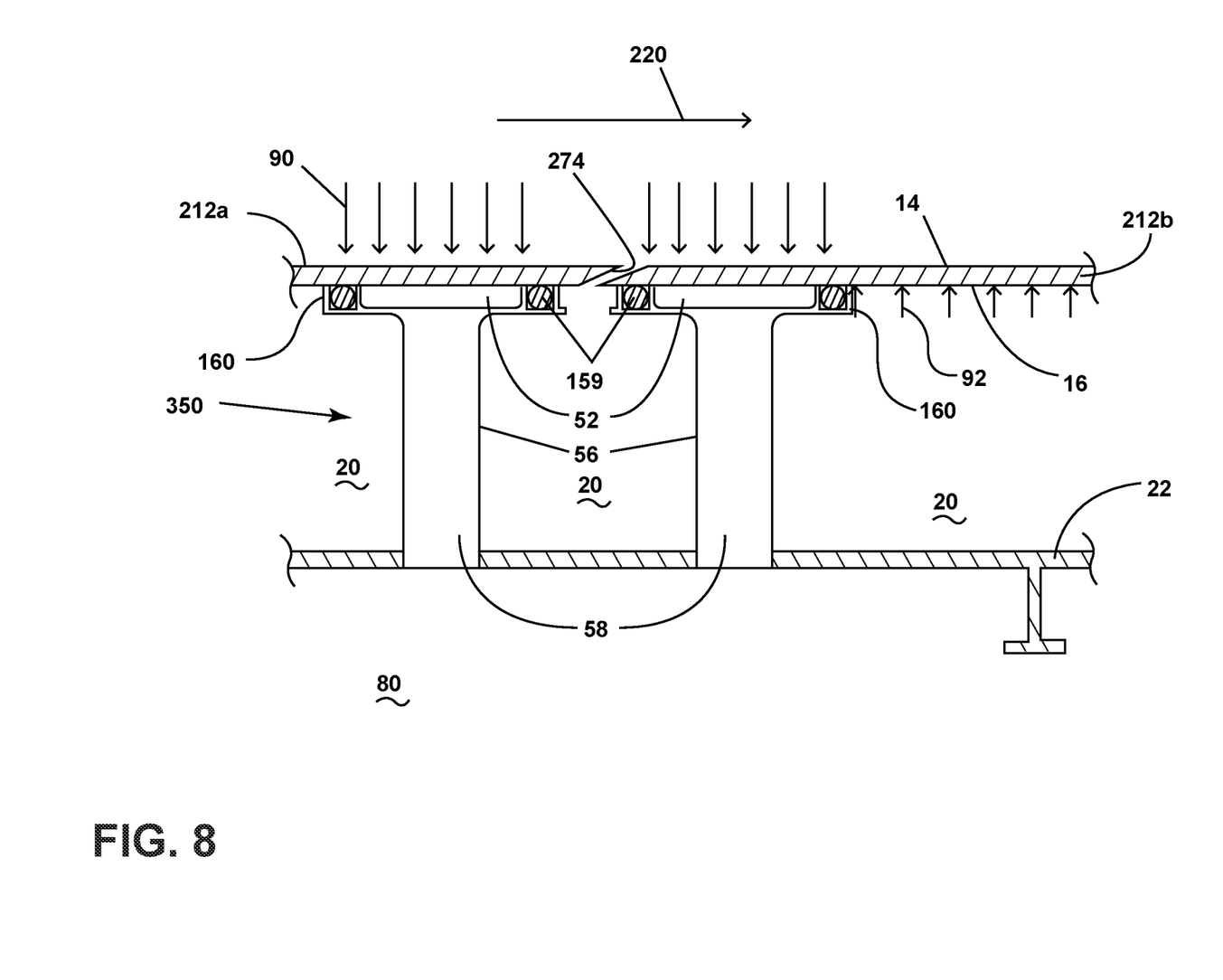
FIG. 8 is a cross-sectional view of the exhaust liner of FIG. 7 depicting a mounting arrangement of the exhaust liner to the exhaust duct parallel to the center slot.

FIG. 8 provides a mounting arrangement for an exhaust liner 212 segmented into a plurality of liner segments with a center slot 274 using the post arrangement of the present invention. FIG. 8 is a cross-sectional view of the exhaust liner of FIG. 7 taken along lines 8-8, depicting a mounting arrangement of the exhaust liner to the exhaust duct. A plurality of posts 350 is used to support exhaust liner 212. In this arrangement, each post 350 includes a pair of shanks 56 extending across annulus 20, through exhaust duct 22 and into engine bay 80. Each shank has a passageway 58 in fluid communication with engine bay and with a post interface region 52. Each post 350 has a pair of face seals 159, each face seal 159 in a seal ring 160. The seal rings 160 in each post 350 are separated by a preselected length. This preselected length is determined by distance requirements such that one assembly of seal ring 160, face seal 159 contacts back side 16 of one exhaust liner segment 212(*a*) and the other assembly of seal ring 160, face seal 159 contacts back side 16 of the other exhaust liner segment 212(*b*). Center slot 274 between the exhaust liner segments 212(*a*), 212(*b*) is positioned so that it is in fluid communication with fan air and opens within the preselected length. In one embodiment, posts are extruded as an array dimensioned for alignment on either side of slot 274, thereby supporting exhaust liner segments 212(*a*) and 212(*b*).

In operation, the arrangement of FIG. 8 facilitates liner alignment. When the engine is in operation, equal pressures are applied to a post 350 by fan air pressure flowing in annulus 20 and by hot exhaust gas pressure (core gas pressure), and each of the passageways 58 of posts 350 generates identical sink air pressure. Since the pressures are the same, posts 350 maintain exhaust liner segments 212(*a*), 212(*b*) in alignment with one another. The fan air pressure flowing through center slot is constant and will not cause movement of exhaust liner segments in relationship to one another.

The post system set forth herein creates an alternating pattern of pressure loads along the surface of an exhaust liner that can result in a reduction in the number of hangers required to mount the exhaust liner 12 in an exhaust system. The alternating pattern of pressure loads reduces the net load on the liner during engine operation, although hangers are still required to maintain the liner in position with respect to the exhaust duct 22 when the engine is not in operation as the alternating pressure loads are not present. When the engine is not in operation, loads are still present, for example, from system weight and some hangers are still required to handle these loads.

The post arrangement can be used to reduce the number of hangers regardless of the materials of construction of the liner, thereby reducing the weight of the system. The post arrangement simplifies the substitution of a CMC liner for a metallic liner. Hangers usually require penetrations through the liner for bolts in order to attach hangers to the liners. Assembly of a large number of hangers and mating the bolts to penetrations in the liner and in the hanger body flange is difficult and time-consuming. Further, each bolt comprises a superalloy material required to survive the high temperatures and harsh atmosphere experienced by the hot gas flow path boundary. The metallic bolts extending through the CMC liner also present another problem. The metallic bolts have a significantly higher coefficient of thermal expansion (CTE) than does the liner. At the elevated temperatures experienced on the gas flow path boundary side 14 of liner 12, without control of tolerances on both the liner and the bolts, high stresses may result that can damage the liner.

The post arrangement thus presents an opportunity to further modify the liner support system using attachment systems other than superalloy bolts. Thus, the bolts used to attach the liner to the hangers may comprise ceramic bolts. Further, ceramic bolts will have a CTE that is similar to that of the liner, so that the elevated temperatures experienced on the gas flow path boundary side of the liner should not result in additional stresses in either the liner of the bolt simply as a result of thermal expansion. The substitution of ceramic bolts in a hanger system for superalloy bolts also results in a further reduction of the weight of the exhaust system.

The hanger body itself also may comprise a ceramic. The substitution of a ceramic hanger body for a metallic hanger body reduces the weight of the exhaust system. A ceramic hanger body used with a ceramic liner also may allow for the elimination of bolts altogether, further reducing the weight of the exhaust system. A ceramic hanger body may be attached to the ceramic liner using a ceramic adhesive, thereby allowing the elimination of bolts. Ceramic adhesive joining a ceramic liner to a ceramic hanger is analogous to a braze material and braze joint joining a metallic liner to a metallic hanger body, but the ceramic system represents a significant weight reduction.

The post system of the present invention may comprise either ceramic material or metallic material. Ceramic material is preferred as it provides a weight that is lower than metallic material. Regardless of the choice of materials, thermal expansion is not a concern since the post system of the present invention is positioned completely within annulus 20 through which fan cooling air flows when the engine is in operation.

While much of the foregoing discussion has focused on applications of the technology described herein to aircraft components, the mounting techniques described herein may be utilized beneficially in many other types of lined or covered systems including industrial ducts and 'smoke' stacks, re-entry vehicle (space shuttle) tiles, etc., in other words, anywhere a pressure differential may be utilized to secure one structure to another structure.

The following enumerated aspects illustrate the exemplary embodiments of the present invention, which may be employed in various combinations all of which are contemplated, except to the extent that any of them may be mutually exclusive.

1. A post in contact with a pressurized surface having a first net pressure, the post creating a low pressure region at the surface contact, comprising:
   an interface region adjacent to the surface;
   a periphery defining a perimeter of the interface region, the perimeter in contact with the surface and sealed to the surface;
   a shank extending from the periphery and to a low pressure region; and
   a hollow passageway internal to the shank, providing fluid communication between the interface region of the post and the low pressure region;
   wherein the low pressure region results in a second net pressure along the surface, urging the surface adjacent the post interface region against the post periphery, the second net pressure different than the first net pressure, while preventing fluid leakage across the post perimeter between the surface and the interface region.

2. The post of aspect 1, wherein the perimeter includes a seal in contact with the surface, wherein the seal seals the post perimeter to the surface when the second net pressure is applied against the surface at the post interface region.

3. An exhaust system for an aircraft engine, comprising:
   an exhaust duct;
   an exhaust liner spaced from the exhaust duct, the exhaust liner having a gas flow path boundary side and an opposite back side;
   core gas flowing along the gas flow path boundary side producing a first pressure on the gas flow path boundary side of the exhaust liner;
   an annulus between the exhaust duct and the exhaust liner;
   cooling air flowing in the annulus producing a second pressure on the back side of the exhaust liner, the second pressure being opposed to the first pressure, producing a first net pressure; and
   a plurality of posts spacing the exhaust liner from the exhaust duct, wherein each post further comprises:
   an interface region adjacent to the back side of the exhaust liner;
   a periphery defining a perimeter of the interface region, the perimeter in contact with the back side of the exhaust liner and sealed to the back side of the exhaust liner;
   a shank extending from the periphery and to a low pressure region, the pressure in the low pressure region being less than the first pressure and the second pressure; and
   a hollow passageway internal to the shank, providing fluid communication between the interface region of the post and the low pressure region;
   wherein the low pressure region results in a second net pressure against the exhaust liner, urging the back side of the exhaust liner adjacent the post interface region against the post periphery while preventing fluid leakage across the post perimeter between the exhaust liner and the interface region; and
   wherein the second net pressure is not equal to the first net pressure.

4. The exhaust system of aspect 3, wherein each post of the plurality of posts further includes a seal on the perimeter of the interface region in contact with the back side of the exhaust liner, wherein the seal prevents leakage of cooling air at the second pressure across the post perimeter into the interface region.

5. The exhaust system of aspects 3 or 4, wherein the exhaust liner comprises a ceramic matrix composite material (CMC), and the plurality of posts are secured to the exhaust liner.

6. The exhaust system of any of aspects 3-5, wherein the plurality of posts is secured to the liner by fasteners extending through the liner.

7. The exhaust system of any of aspects 3-6, wherein the fasteners securing the plurality of posts to the liner are metallic fasteners.

8. The exhaust system of any of aspects 3-7, wherein the first net pressure and the second net pressure provide the liner with alternating regions of net pressure resulting in a reduction of overall inward pressure applied to the liner.

9. The exhaust system of any of aspects 3-8, wherein the at least one post of the plurality of posts further including a spring positioned within the post interface region, the spring applying a spring force sufficient for loading the seal against the back side of the liner even as the perimeter moves in response to dynamic conditions or manufacturing tolerances.

10. The exhaust system of any of aspects 3-9, wherein dynamic conditions include changes in net pressure, deflection of the liner during engine operation and liner thermal expansion.

11. The exhaust system of any of aspects 3-10, wherein the periphery includes a surface of predetermined geometry facing the exhaust liner, the periphery surface of predetermined geometry maintaining the seal in contact with a mating surface of the back side of the exhaust liner as a result of rolling misalignment of the liner with respect to the periphery of the post, the mating surface of the back side of the exhaust liner also having a predetermined geometry.

12. The exhaust system of any of aspects 3-11, wherein the predetermined geometry of the periphery surface is selected from a group of geometries consisting of flat, convex, and concave.

13. The exhaust system of any of aspects 3-12, wherein rolling misalignment of the liner includes thermal expansion of the liner, liner movement due to pressure pulses, duct/liner distortion, and liner deflection due to operational demands.

14. The exhaust system of any of aspects 3-13, wherein the mating surface of the back side of the exhaust liner is selected from a group of geometries consisting of convex and concave.

15. An aircraft comprising:
an engine bay, the engine bay maintained substantially at atmospheric pressure; and
an aircraft engine housed within the engine bay, the aircraft engine including an exhaust system further comprising:
an exhaust duct mounted in the engine bay;
an exhaust liner spaced from the exhaust duct, the exhaust liner having a gas flow path boundary side and an opposite back side;
an annulus between the exhaust duct and the exhaust liner; and
a plurality of posts spacing the exhaust liner from the exhaust duct, wherein each post further comprises:
an interface region adjacent to the back side of the exhaust liner;
a periphery defining a perimeter of the interface region, the perimeter in contact with the back side of the exhaust liner and sealed to the back side of the exhaust liner;
a shank extending from the periphery and in fluid communication with a low pressure region; and
a hollow passageway internal to the shank, providing fluid communication between the interface region of the post and the low pressure region;
wherein the low pressure region results in a net positive outward pressure against the exhaust liner, resulting in the back side of the exhaust liner adjacent the post interface region contacting the post periphery while preventing fluid leakage across the post perimeter.

16. The aircraft of aspect 15, wherein the low pressure region is the engine bay and the shank extends into the engine bay.

17. The aircraft of aspects 15 or 16, further including a vacuum pump, wherein the vacuum pump is a low pressure region.

18. The aircraft of any of aspects 15-17, wherein the low pressure region includes a divergent nozzle region in the exhaust system.

19. The aircraft of any of aspects 15-18, wherein each post of the plurality of posts spacing the exhaust liner from the exhaust duct further includes a seal on the perimeter of the interface region in contact with the back side of the exhaust liner, wherein the seal prevents leakage of cooling air at the second pressure into the interface region.

20. The aircraft of any of aspects 15-19, wherein the exhaust liner comprises a ceramic matrix composite material (CMC), and the plurality of posts are secured to the exhaust liner.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A post for contacting an exhaust liner having a first net pressure at a first region, the post comprising:
an interface region;
a periphery for contacting the exhaust liner in sealing engagement with the exhaust liner, the periphery defining a perimeter of the interface region;
a shank extending from the periphery and to a first pressure region; and
a hollow passageway internal to the shank, providing fluid communication between the interface region of the post and the first pressure region to create a pressure differential adjacent the interface region;
wherein the first pressure region results in a second net pressure at the interface region, urging the exhaust liner adjacent the interface region against the periphery, the second net pressure greater than the first net pressure, while preventing fluid leakage across the perimeter between the exhaust liner and the interface region.

2. The post of claim 1, wherein the perimeter includes a seal in contact with the exhaust liner, wherein the seal seals the perimeter to the exhaust liner when the second net pressure is applied against the exhaust liner at the interface region.

3. An exhaust system for an aircraft engine, comprising:
an exhaust duct;
an exhaust liner spaced from the exhaust duct, the exhaust liner having a gas flow path boundary side and a back side opposite the gas flow path boundary side;
core gas flowing along the gas flow path boundary side producing a first pressure on the gas flow path boundary side of the exhaust liner;
an annulus between the exhaust duct and the exhaust liner;
cooling air flowing in the annulus producing a second pressure on the back side of the exhaust liner, the second pressure being opposed to the first pressure, producing a first net pressure; and a plurality of posts spacing the exhaust liner from the exhaust duct, wherein each post further comprises:
an interface region adjacent to the back side of the exhaust liner;
a periphery defining a perimeter of the interface region, the perimeter in contact with the back side of the exhaust liner and sealed to the back side of the exhaust liner;
a shank extending from the periphery and to a low pressure region, the pressure in the low pressure region being less than the first pressure and the second pressure; and
a hollow passageway internal to the shank, providing fluid communication between the interface region of the post and the low pressure region;
wherein the low pressure region results in a second net pressure against the exhaust liner, urging the back side of the exhaust liner adjacent the interface region against the periphery while preventing fluid leakage across the perimeter between the exhaust liner and the interface region; and
wherein the second net pressure is not equal to the first net pressure.

4. The exhaust system of claim 3, wherein each post of the plurality of posts further includes a seal on the perimeter of the interface region in contact with the back side of the exhaust liner, wherein the seal prevents leakage of cooling air at the second pressure across the perimeter into the interface region.

5. The exhaust system of claim 3, wherein the exhaust liner comprises a ceramic matrix composite material (CMC), and the plurality of posts are secured to the exhaust liner.

6. The exhaust system of claim 5, wherein the plurality of posts is secured to the exhaust liner by fasteners extending through the exhaust liner.

7. The exhaust system of claim 6, wherein the fasteners securing the plurality of posts to the exhaust liner are metallic fasteners.

8. The exhaust system of claim 3, wherein the first net pressure and the second net pressure provide the liner with alternating regions of net pressure resulting in a reduction of overall inward pressure applied to the liner.

9. The exhaust system of claim 4, wherein at least one post of the plurality of posts further includes a spring positioned within the interface region, the spring applying a spring force sufficient for loading the seal against the back side of the liner even as the perimeter moves in response to dynamic conditions or manufacturing tolerances.

10. The exhaust system of claim 9, wherein dynamic conditions include changes in net pressure, deflection of the exhaust liner during engine operation and liner thermal expansion.

11. The exhaust system of claim 4, wherein the periphery includes a surface of predetermined geometry facing the exhaust liner, the surface of predetermined geometry maintaining the seal in contact with a mating surface of the back side of the exhaust liner as a result of rolling misalignment of the liner with respect to the periphery of the post, the mating surface of the back side of the exhaust liner also having a predetermined geometry.

12. The exhaust system of claim 11, wherein the predetermined geometry of the surface is selected from a group of geometries consisting of flat, convex, and concave.

13. The exhaust system of claim 11, wherein rolling misalignment of the exhaust liner includes thermal expansion of the exhaust liner, liner movement due to pressure pulses, duct/liner distortion, and liner deflection due to operational demands.

14. The exhaust system of claim 11, wherein the mating surface of the back side of the exhaust liner is selected from a group of geometries consisting of convex and concave.

15. An aircraft comprising:
an engine bay, the engine bay maintained substantially at atmospheric pressure; and
an aircraft engine housed within the engine bay, the aircraft engine including an exhaust system further comprising:
an exhaust duct mounted in the engine bay;
an exhaust liner spaced from the exhaust duct, the exhaust liner having a gas flow path boundary side and a back side opposite the gas flow path boundary side;
an annulus between the exhaust duct and the exhaust liner; and
a plurality of posts spacing the exhaust liner from the exhaust duct, wherein each post further comprises:
an interface region adjacent to the back side of the exhaust liner;
a periphery defining a perimeter of the interface region, the perimeter in contact with the back side of the exhaust liner and sealed to the back side of the exhaust liner;
a shank extending from the periphery and in fluid communication with a first pressure region; and
a hollow passageway internal to the shank, providing fluid communication between the interface region of the post and the first pressure region;
wherein the first pressure region results in a net positive outward pressure against the exhaust liner, urging the back side of the exhaust liner adjacent the interface region against the periphery while preventing fluid leakage across the perimeter.

16. The aircraft of claim 15, wherein the first pressure region is the engine bay and the shank extends into the engine bay.

17. The aircraft of claim 15, wherein the first pressure region includes a vacuum pump.

18. The aircraft of claim 15, wherein the first pressure region includes a divergent nozzle region in the exhaust system.

19. The aircraft of claim 15, wherein each post of the plurality of posts spacing the exhaust liner from the exhaust duct further includes a seal on the perimeter of the interface region in contact with the back side of the exhaust liner, wherein the seal prevents leakage of cooling air into the interface region.

20. The aircraft of claim 15, wherein the exhaust liner comprises a ceramic matrix composite material (CMC), and the plurality of posts are secured to the exhaust liner.

* * * * *